(12) United States Patent
Yang et al.

(10) Patent No.: US 12,509,065 B2
(45) Date of Patent: Dec. 30, 2025

(54) METHOD OF CONTROLLING AUTONOMOUS VEHICLE, ELECTRONIC DEVICE, AND STORAGE MEDIUM

(71) Applicant: Apollo Intelligent Driving Technology (Beijing) Co., Ltd., Beijing (CN)

(72) Inventors: Huangrong Yang, Beijing (CN); Mengqi Xie, Beijing (CN); Lin Ma, Beijing (CN); Zhongpu Xia, Beijing (CN)

(73) Assignee: Apollo Intelligent Driving Technology (Beijing) Co., Ltd, Beijing (CN)

( * ) Notice: Subject to any disclaimer, the term of this patent is extended or adjusted under 35 U.S.C. 154(b) by 251 days.

(21) Appl. No.: 18/199,525

(22) Filed: May 19, 2023

(65) Prior Publication Data

US 2023/0294684 A1    Sep. 21, 2023

(30) Foreign Application Priority Data

May 20, 2022 (CN) .......................... 202210561545.4

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0953* (2013.01); *B60W 30/0956* (2013.01);
(Continued)

(58) Field of Classification Search
CPC ............. B60W 30/09; B60W 30/0953; B60W 30/0956; B60W 30/18163;
(Continued)

(56) References Cited

U.S. PATENT DOCUMENTS

2017/0291602 A1* 10/2017 Newman ................ B60W 50/16
2017/0369062 A1* 12/2017 Saigusa ................. B60W 30/16
(Continued)

FOREIGN PATENT DOCUMENTS

CN    109017792 A    12/2018
CN    111923910 A    11/2020
(Continued)

OTHER PUBLICATIONS

Kim, Changhee, Heungseok Chae, and Kyongsu Yi. "Lateral motion planning for evasive lane keeping of autonomous driving vehicles based on target prioritization." 2021 IEEE International Intelligent Transportation Systems Conference (ITSC). IEEE, 2021. (Year: 2021).*

(Continued)

*Primary Examiner* — Russell Frejd
*Assistant Examiner* — Ana D Thomas
(74) *Attorney, Agent, or Firm* — Keating & Bennett, LLP

(57) ABSTRACT

A method of controlling an autonomous vehicle, an electronic device, and a storage medium, which relate to fields of an artificial intelligence, autonomous driving, intelligent transportation, high-definition maps, cloud services, and Internet of Vehicles technologies. The method includes determining, in response to an obstacle avoidance instruction being received, an obstacle avoidance strategy in lane changing according to first obstacle data of a target obstacle, the obstacle avoidance instruction being generated in response to determining that a first relationship between the target obstacle and a vehicle meets a predetermined collision condition, and the first relationship being generated based on the first obstacle data and first vehicle data of the vehicle; controlling the vehicle to travel according to the obstacle avoidance strategy; and updating a planned path for lane changing in response to a risk relief instruction being received, so that the vehicle travels according to the updated planned path.

20 Claims, 6 Drawing Sheets

First scene    Second scene    Third scene    Fourth scene

(51) Int. Cl.
*B60W 30/18* (2012.01)
*B60W 60/00* (2020.01)

(52) U.S. Cl.
CPC .. *B60W 30/18163* (2013.01); *B60W 60/0015* (2020.02); *B60W 2554/4044* (2020.02); *B60W 2554/80* (2020.02)

(58) Field of Classification Search
CPC ..... B60W 60/0015; B60W 2554/4044; B60W 2554/80; B60W 2552/50; B60W 2556/40; B60W 2556/45; B60W 50/0097; B60W 60/0017; B60W 40/02; B60W 50/0098
See application file for complete search history.

(56) References Cited

U.S. PATENT DOCUMENTS

| | | | |
|---|---|---|---|
| 2020/0247414 | A1 | 8/2020 | Ishioka et al. |
| 2023/0037367 | A1 | 2/2023 | Qian |

FOREIGN PATENT DOCUMENTS

| | | | |
|---|---|---|---|
| CN | 112416004 | A | 2/2021 |
| CN | 113050452 | A | 6/2021 |
| CN | 113183962 | A | 7/2021 |
| CN | 113525373 | A | 10/2021 |
| CN | 113859242 | A | 12/2021 |
| CN | 114312835 | A | 4/2022 |
| KR | 20180096114 | A | 8/2018 |

OTHER PUBLICATIONS

J. E. Naranjo, C. Gonzalez, R. Garcia and T. de Pedro, "Lane-Change Fuzzy Control in Autonomous Vehicles for the Overtaking Maneuver," in IEEE Transactions on Intelligent Transportation Systems, vol. 9, No. 3, pp. 438-450, Sep. 2008 (Year: 2008).*

Official Communication issued in corresponding Chinese Patent Application No. 202210561545.4, mailed on Sep. 26, 2024, 9 pages.

* cited by examiner

METHOD OF CONTROLLING AUTONOMOUS VEHICLE, ELECTRONIC DEVICE, AND STORAGE MEDIUM

This application claims priority to Chinese Patent Application No. 202210561545.4, filed on May 20, 2022, the entire content of which is incorporated herein in its entirety by reference.

TECHNICAL FIELD

The present disclosure relates to a field of an artificial intelligence technology, and in particular, to fields of autonomous driving, intelligent transportation, high-definition maps, cloud services, and Internet of Vehicles technologies. More specifically, the present disclosure relates to a method of controlling an autonomous vehicle, an electronic device, and a storage medium.

BACKGROUND

A vehicle operating in an autonomous mode may free occupants, especially a driver, from some driving-related responsibilities. When operating in the autonomous mode, the vehicle may be navigated to various locations using an on board sensor, allowing the vehicle to travel with minimal human-machine interaction or in some situations without any passengers.

Lane-changing travelling generally refers to travelling to change lanes to a corresponding turning lane in response to an instruction for turning, or travelling to change lanes in response to an instruction for bypassing a construction section. However, for a complex lane-changing travelling scene, there will be a lot of sudden driving situations caused by dynamic obstacles, causing the vehicle to be unable to safely change lanes according to a planned path for lane changing.

SUMMARY

The present disclosure provides a method of controlling an autonomous vehicle, an electronic device, and a storage medium.

According to an aspect of the present disclosure, a method of controlling an autonomous vehicle is provided, including: determining, in response to an obstacle avoidance instruction being received, an obstacle avoidance strategy in lane changing according to first obstacle data of a target obstacle, wherein the obstacle avoidance instruction is generated in response to determining that a first relationship between the target obstacle and a vehicle meets a predetermined collision condition, and the first relationship between the target obstacle and the vehicle is generated based on the first obstacle data of the target obstacle and first vehicle data of the vehicle; controlling the vehicle to travel according to the obstacle avoidance strategy in lane changing; and updating a planned path for lane changing in response to a risk relief instruction being received, so that the vehicle travels according to the updated planned path for lane changing, wherein the risk relief instruction is generated in response to determining that a second relationship between the target obstacle and the vehicle does not meet the predetermined collision condition, and the second relationship between the target obstacle and the vehicle is generated based on second obstacle data of the target obstacle and second vehicle data of the vehicle.

According to another aspect of the present disclosure, an electronic device is provided, including: at least one processor; and a memory communicatively connected to the at least one processor, wherein the memory stores instructions executable by the at least one processor, and the instructions, when executed by the at least one processor, are configured to cause the at least one processor to implement the method provided by the present disclosure.

According to another aspect of the present disclosure, a non-transitory computer readable storage medium having computer instructions therein is provided, wherein the computer instructions are configured to cause a computer to implement the method provided by the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Exemplary embodiments of the present disclosure will be described below with reference to accompanying drawings, which include various details of embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

The present disclosure provides a method and an apparatus of controlling an autonomous vehicle, an electronic device, an autonomous vehicle, a storage medium, and a program product.

According to embodiments of the present disclosure, a method of controlling an autonomous vehicle is provided, including: determining, in response to an obstacle avoidance instruction being received, an obstacle avoidance strategy in lane changing according to first obstacle data of a target obstacle, where the obstacle avoidance instruction is generated in response to determining that a first relationship between the target obstacle and a vehicle meets a predetermined collision condition, and the first relationship between the target obstacle and the vehicle is generated based on the first obstacle data of the target obstacle and first vehicle data of the vehicle; controlling the vehicle to travel according to the obstacle avoidance strategy in lane changing; and updating a planned path for lane changing in response to a risk relief instruction being received, so that the vehicle travels according to the updated planned path for lane changing, where the risk relief instruction is generated in response to determining that a second relationship between the target obstacle and the vehicle does not meet the predetermined collision condition, and the second relationship between the target obstacle and the vehicle is generated based on second obstacle data of the target obstacle and second vehicle data of the vehicle.

In the technical solution of the present disclosure, the processes of collecting, storing, using, processing, transmitting, providing, disclosing and applying traffic information and location information involved comply with the provisions of relevant laws and regulations, adopt necessary security measures, and do not violate public order and good customs.

In the technical solution of the present disclosure, prior to acquiring or collecting user personal information, authorization or consent from a user has been obtained.

Figure 1:
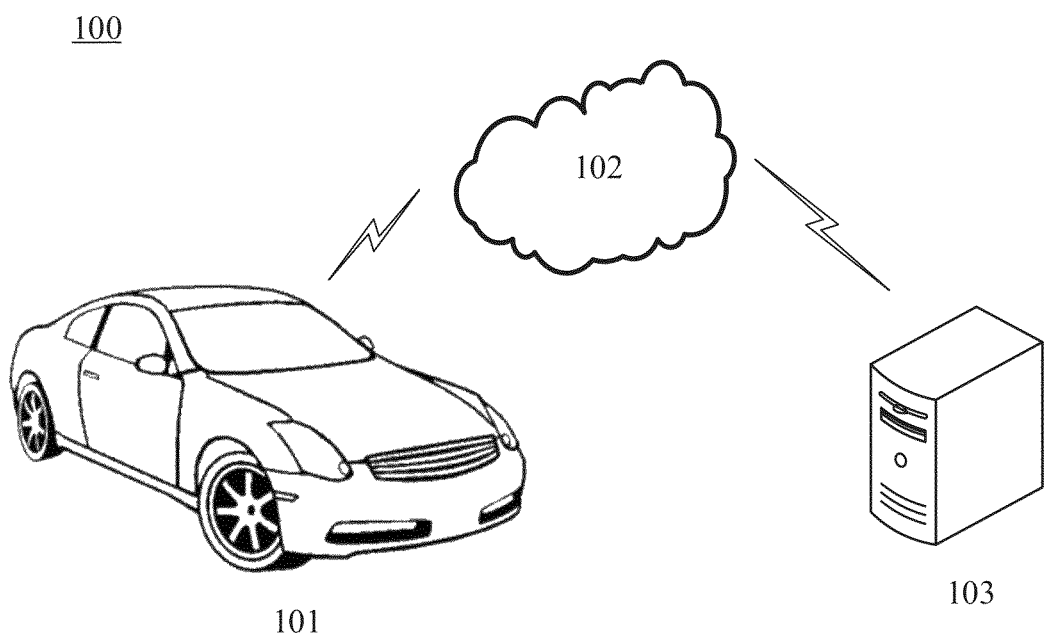
FIG. 1 schematically illustrates an exemplary system architecture to which a method and an apparatus of controlling an autonomous vehicle may be applied according to an embodiment of the present disclosure.

FIG. 1 schematically illustrates an exemplary system architecture to which a method and an apparatus of controlling an autonomous vehicle may be applied according to an embodiment of the present disclosure.

It should be noted that FIG. 1 is only an example of a system architecture to which embodiments of the present disclosure may be applied to help those skilled in the art understand the technical content of the present disclosure, and does not mean that embodiments of the present disclosure may not be applied for other devices, systems, environments, or scenarios. For example, in another embodiment, an exemplary system architecture to which a method and an apparatus of controlling an autonomous vehicle may be applied may include an on-board terminal of the autonomous vehicle, the on-board terminal may implement the method and the apparatus of controlling an autonomous vehicle provided in embodiments of the present disclosure without interacting with a server.

As shown in FIG. 1, a system architecture 100 according to embodiments may include an autonomous vehicle 101, a network 102, and a server 103. The autonomous vehicle 101 may be communicatively connected to one or more servers 103 through the network 102. The network 102 may be any type of network, such as a wired or wireless local area network (LAN), a wide area network (WAN) such as the Internet, a cellular network, a satellite network, or a combination thereof. The server 103 may be any type of server or cluster of servers, such as a network or cloud server, an application server, a back-end server, or a combination thereof. The server may be a data analysis server, a content server, a traffic information server, a map and point of interest (MPOI) server, or a location server, and the like.

The autonomous vehicle 101 may refer to a vehicle configured to operate in an autonomous mode. However, the present disclosure is not limited to this. The autonomous vehicle may also operate in a manual mode, a fully autonomous mode, or a partially autonomous mode.

The autonomous vehicle 101 may include: an on-board terminal, a vehicle control module, a wireless communication module, a user interface module, and a sensing module. The autonomous vehicle 101 may further include common components included in an ordinary vehicle, such as an engine, a wheel, a steering wheel, a transmission, and the like. The common components may be controlled by the on-board terminal and the vehicle control module using various communication instructions, such as an acceleration instruction, a deceleration instruction, a steering instruction, and a braking instruction.

Various modules in the autonomous vehicle 101 may be communicatively connected to each other through an interconnection, a bus, a network, or a combination thereof. For example, the various modules may be communicatively connected to each other through a controller area network (CAN) bus. The CAN bus is a vehicle bus standard designed to allow a microcontroller and an apparatus to communicate with each other in applications without a host.

The sensing module may include, but is not limited to, one or more cameras, a global positioning system (GPS) unit, an inertial measurement unit (IMU), a radar unit, and a light detection and ranging (LIDAR) unit. The GPS unit may include a transceiver operable to provide location information of the autonomous vehicle. The IMU unit may sense the location and orientation changes of the autonomous vehicle based on an inertial acceleration. The radar unit may represent a system that uses a radio signal to sense an obstacle in a surrounding environment of the autonomous vehicle. In addition to sensing the obstacle, the radar unit may also sense a speed of the obstacle and/or a forward direction of the obstacle. The LIDAR unit may use a laser to sense an obstacle in an environment in which the autonomous vehicle is located. The LIDAR unit may include, among other components, one or more laser sources, a laser scanner, and one or more detectors. The camera may include one or more apparatuses used to capture an image of the surrounding environment of the autonomous vehicle. The camera may be a digital still camera and/or a video camera. The camera may be mechanically movable, for example, by installing the camera on a rotating or tilting platform.

The sensing module may further include other sensors, such as a sonar sensor, an infrared sensor, a steering sensor, a throttle sensor, a braking sensor, and an audio sensor (such as a microphone). The audio sensor may be used to collect sound from the surrounding environment of the autonomous vehicle. The steering sensor may be used to sense a steering angle of the steering wheel, the wheels of the autonomous vehicle, or a combination thereof. The throttle sensor and the braking sensor sense a throttle location and a brake location of the autonomous vehicle, respectively. In some cases, the throttle sensor and the braking sensor may be integrated into an integrated throttle/braking sensor.

The vehicle control module may include but is not limited to a steering unit, a throttle unit (also known as acceleration unit), and a braking unit. The steering unit is used to adjust a direction or a forward direction of the autonomous vehicle. The throttle unit is used to control a speed of an electric motor or an engine, thereby controlling a speed and an acceleration of the autonomous vehicle. The braking unit decelerates the autonomous vehicle by providing friction to slow down the wheels or tires of the autonomous vehicle.

The wireless communication module allows communication between the autonomous vehicle and external modules such as an apparatus, a sensor, and other vehicles. For example, a wireless communication module may directly communicate wirelessly with one or more apparatuses, or perform wireless communication through a communication network, such as communicating with a server through a network. The wireless communication module may use any cellular communication network or wireless local area network (WLAN), e.g., using WiFi, to communicate with another component or module. The user interface module may be a part of a peripheral apparatus implemented in the autonomous vehicle, including, for example, a keyboard, a touch screen display apparatus, a microphone, and a speaker.

Some or all of the functions of the autonomous vehicle 101 may be controlled or managed by the on-board terminal, especially when operating in the autonomous mode. The on-board terminal includes necessary hardware (such as a processor, a memory, a storage apparatus) and software (such as an operating system, a planning and routing program) to receive information from the sensing module, the control module, the wireless communication module, and/or the user interface module, process the received information, and generate an instruction for controlling the autonomous vehicle. Alternatively, the on-board terminal may be integrated with the control module.

For example, a user as a passenger may specify a start location and a destination of a trip, for example, via the user interface module. The on-board terminal obtains trip-related data. For example, the on-board terminal may obtain a location and a travelable path from the MPOI server, and the MPOI server may be a part of the server. The location server provides a location service, and the MPOI server provides a map service. Alternatively, such locations and maps may be locally cached in a permanent storage apparatus of the on-board terminal.

When the autonomous vehicle moves along a travelable path, the on-board terminal may also obtain real-time traffic information from a traffic information system or server. The server may be operated by a third-party entity. A function of the server may be integrated with the on-board terminal. Based on the real-time traffic information, location information, and real-time local environmental data detected or sensed by the sensing module, the on-board terminal may plan an optimal path and control the autonomous vehicle according to the planned optimal path, for example, through the control module, to safely and efficiently reach a designated destination.

It should be understood that the number of autonomous vehicles, networks, and servers shown in FIG. 1 is merely illustrative. There may be any number of autonomous vehicles, networks, and servers as desired for implementation.

It should be noted that the sequence numbers of the respective operations in the following methods are only used as a representation of the operations for description, and should not be regarded as representing the execution order of the respective operations. The method does not need to be performed in the exact order shown, unless explicitly stated.

Figure 2:
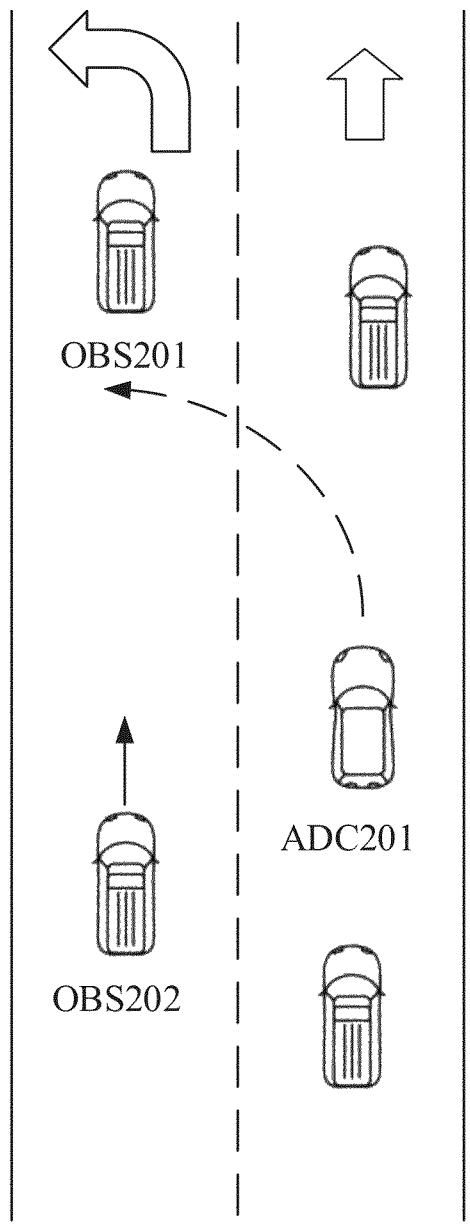
FIG. 2 schematically illustrates an application scenario diagram of a method of controlling an autonomous vehicle according to an embodiment of the present disclosure.

FIG. 2 schematically illustrates an application scenario diagram of a method of controlling an autonomous vehicle according to an embodiment of the present disclosure.

As shown in FIG. 2, a vehicle (i.e., an autonomous vehicle, hereinafter referred to as the vehicle) ADC201 operates in an autonomous mode, and is controlled by the on-board terminal to change lanes from a straight lane to a left lane. A planned path for lane changing of the vehicle ADC201 is set as: from a travelling location of the straight lane to a lane-changing entrance between a first obstacle OBS201 and a second obstacle OBS202 travelling in the left lane. While the vehicle ADC201 is travelling according to the planned path for lane changing, the second obstacle OBS202 travelling in the left lane suddenly accelerates. If the vehicle ADC201 continues to travel according to the planned path for lane changing, there will be a collision risk. In this case, the on-board terminal may generate an obstacle avoidance strategy in lane changing based on obstacle data of the second obstacle OBS202, such as the travelling path and the travelling speed of the second obstacle OBS202. The vehicle ADC201 is controlled to travel according to the obstacle avoidance strategy in lane changing, so that when travelling in a lane-changing process, the vehicle may safely avoid the second obstacle OBS202 while completing a lane-changing task.

Figure 3:
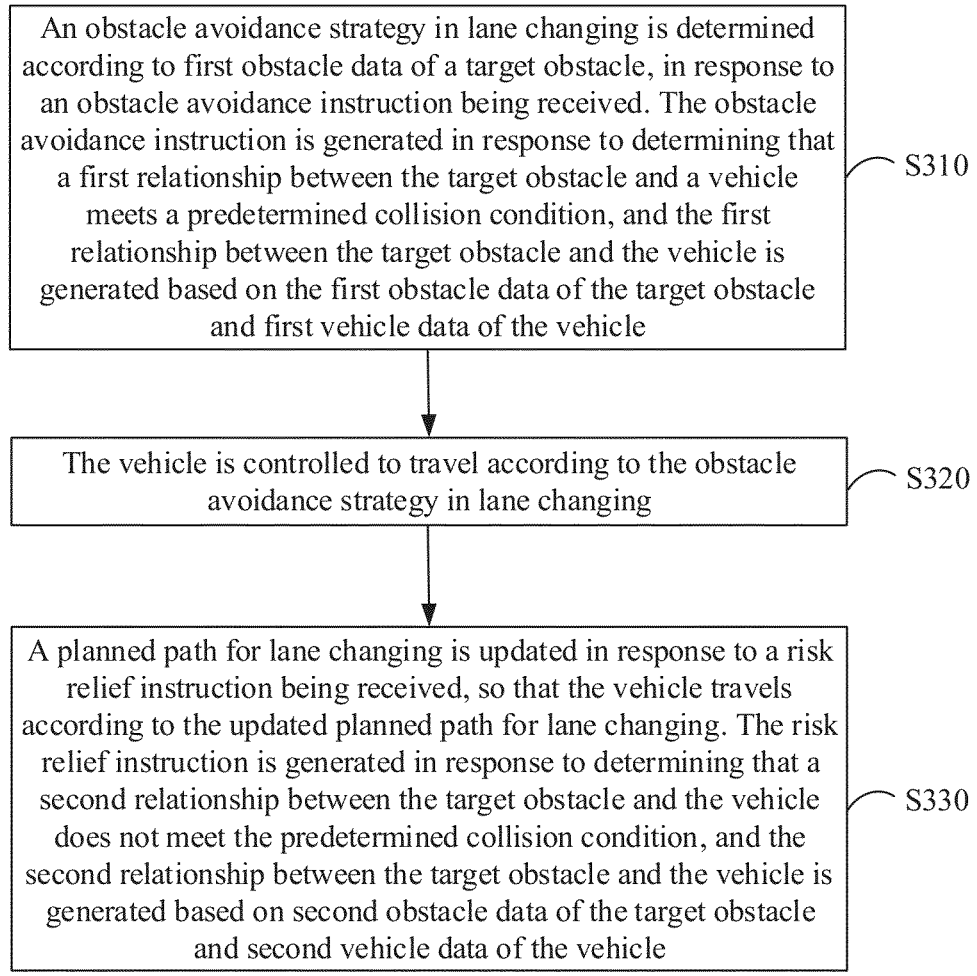
FIG. 3 schematically illustrates a flowchart of a method of controlling an autonomous vehicle according to an embodiment of the present disclosure.

FIG. 3 schematically illustrates a flowchart of a method of controlling an autonomous vehicle according to an embodiment of the present disclosure.

As shown in FIG. 3, the method includes operation S310 to operation S330.

In operation S310, an obstacle avoidance strategy in lane changing is determined according to first obstacle data of a target obstacle, in response to an obstacle avoidance instruction being received. The obstacle avoidance instruction is generated in response to determining that a first relationship between the target obstacle and a vehicle meets a predetermined collision condition, and the first relationship between the target obstacle and the vehicle is generated based on the first obstacle data of the target obstacle and first vehicle data of the vehicle.

In operating S320, the vehicle is controlled to travel according to the obstacle avoidance strategy in lane changing.

In operation S330, a planned path for lane changing is updated in response to a risk relief instruction being received, so that the vehicle travels according to the updated planned path for lane changing. The risk relief instruction is generated in response to determining that a second relationship between the target obstacle and the vehicle does not meet the predetermined collision condition, and the second relationship between the target obstacle and the vehicle is generated based on second obstacle data of the target obstacle and second vehicle data of the vehicle.

According to embodiments of the present disclosure, the obstacle avoidance instruction may be generated in response to determining that the first relationship between the target obstacle and the vehicle meets the predetermined collision condition. The obstacle avoidance instruction may be an obstacle avoidance instruction triggered by a driver based on surrounding environment information, but is not limited to this, and may also be an obstacle avoidance instruction automatically triggered by a server or an on-board terminal based on the surrounding environment information. The first relationship between the target obstacle and the vehicle may include a relative distance between the target obstacle and the vehicle and/or a relative speed between the target obstacle and the vehicle. The first relationship between the target obstacle and the vehicle meeting the predetermined collision condition may refer to that a collision risk exists between the vehicle and the target obstacle.

According to embodiments of the present disclosure, the obstacle avoidance strategy in lane changing may refer to changing (e.g., fine tuning) a travelling state of a vehicle while maintaining the lane-changing travelling process. Changing the travelling state of the vehicle may include changing a longitudinal acceleration of the vehicle, changing a lateral acceleration of the vehicle, changing a deflection angle of the vehicle, and changing a travelling angle of the vehicle.

According to other embodiments of the present disclosure, the following operations may also be performed: for example, a lane-changing interruption strategy or a lane-changing termination strategy may be determined according to the first obstacle data of the target obstacle, in response to an obstacle avoidance instruction being received. The lane-changing interruption strategy may refer to a strategy of interrupting the lane changing, for example, an instruction to control an emergency return of the vehicle. For example, the lane-changing interruption strategy may include: in response to the obstacle avoidance instruction being received, re-planning a new path based on a current location of the vehicle, travelling according to the new path, and terminating the lane changing (rather than returning to an original lane). The lane-changing termination strategy for the target vehicle may refer to a strategy of canceling the lane changing, e.g., a strategy of controlling the vehicle to return to the original lane.

According to embodiments of the present disclosure, in response to a risk relief instruction being received, the on-board terminal or server may control the vehicle to travel according to a target planned path for lane changing. Different from controlling the vehicle to travel according to the lane-changing interruption strategy or the lane-changing termination strategy, controlling the vehicle to travel according to the obstacle avoidance strategy in lane changing may quickly perform the lane-changing task when the risk is relieved, thereby improving the flexibility and intelligence of lane changing.

Figure 4:
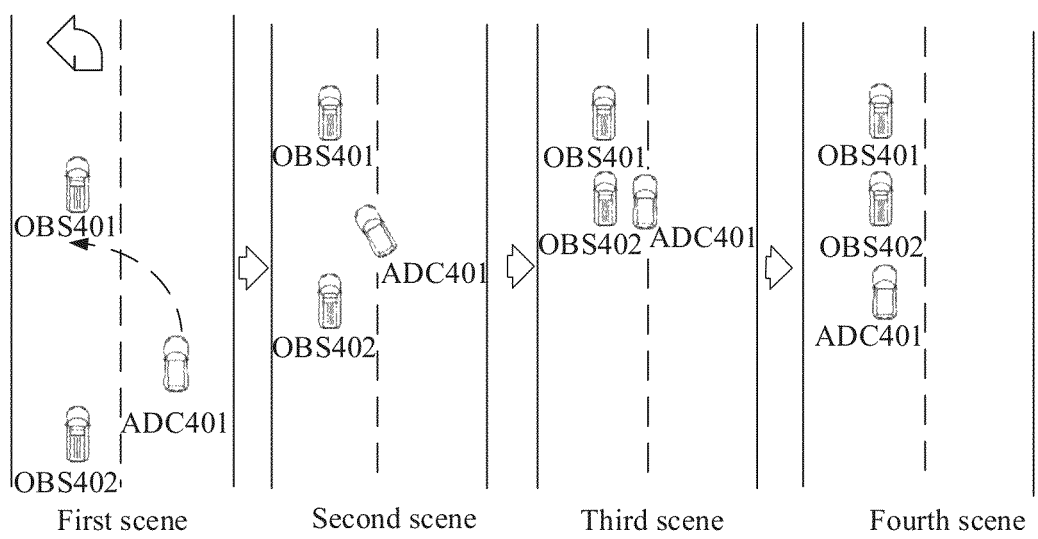
FIG. 4 schematically illustrates a schematic diagram of a method of controlling an autonomous vehicle according to an embodiment of the present disclosure.

FIG. 4 schematically illustrates a method of controlling an autonomous vehicle according to an embodiment of the present disclosure.

As shown in a first scene in FIG. 4, an on-board terminal on a vehicle ADC401 may acquire scene data for lane changing about surroundings of the vehicle ADC401 from a sensing module in response to a lane-changing instruction being received. A lane-changing entrance, such as a lane-changing entrance between a first obstacle OBS401 and a second obstacle OBS402, may be determined based on the scene data for lane changing. The Vehicle ADC401 may generate the planned path for lane changing based on the travelling location and the lane-changing entrance.

As shown in a second scene in FIG. 4, during a process of the on-board terminal controlling the vehicle ADC401 to change lanes according to the planned path for lane changing, the on-board terminal may monitor obstacle data related to the lane changing in a surrounding environment through the sensing module loaded on the vehicle ADC401. The target obstacle may be determined from a plurality of obstacles based on respective obstacle data of the plurality of obstacles. For example, the second obstacle OBS402 is determined as the target obstacle. The target obstacle may refer to an obstacle that poses a collision risk with the vehicle continuing to travel according to the planned path for lane changing.

According to embodiments of the present disclosure, the on-board terminal may determine the first relationship between the target obstacle and the vehicle based on the acquired first obstacle data of the target obstacle, first vehicle data of the vehicle, and the like. In response to determining that the first relationship between the target obstacle and the vehicle meets the predetermined collision condition, the on-board terminal or server generates the obstacle avoidance instruction.

As shown in a third scene in FIG. 4, the on-board terminal may determine, in response to an obstacle avoidance instruction being received, an obstacle avoidance strategy in lane changing according to the first obstacle data of the target obstacle. The vehicle ADC401 is controlled to travel according to the obstacle avoidance strategy in lane changing. For example, a lateral acceleration and a longitudinal acceleration may be determined according to the obstacle avoidance strategy in lane changing, and the vehicle ADC401 may be controlled to travel according to the lateral acceleration and the longitudinal acceleration. For example, a lateral acceleration and a longitudinal acceleration of the vehicle ADC401 for avoiding the second obstacle OBS402 may be determined according to the obstacle avoidance strategy in lane changing. For example, the vehicle accelerates laterally in a direction that deviates from the second obstacle OBS402 and decelerates longitudinally.

As shown in a fourth scene in FIG. 4, when travelling according to the obstacle avoidance strategy in lane changing, the vehicle collects second obstacle data of the target obstacle, such as the second obstacle OBS402, in real time by using the sensing module. The on-board terminal receives the second obstacle data of the target obstacle, and determines the second relationship between the target obstacle and the vehicle ADC401 based on the second obstacle data of the target obstacle and the second vehicle data of the vehicle. The on-board terminal generates a risk relief instruction in response to determining that the second relationship between the target obstacle and the vehicle does not meet the predetermined collision condition. In response to the risk relief instruction being received, the on-board terminal changes from being in a stage of avoiding in lane changing to being in a stage of updating the planned path for lane changing in which the planned path for lane changing is updated to generate the updated planned path for lane changing. The on-board terminal may control the vehicle to travel according to the updated planned path for lane changing and finally complete the lane-changing task.

According to embodiments of the present disclosure, the on-board terminal or server determines that the second relationship between the target obstacle and the vehicle does not meet the predetermined collision condition based on the second obstacle data of the target obstacle and the second vehicle data of the vehicle. The second relationship between the target obstacle and the vehicle not meeting the predetermined collision condition may mean that: no collision risk exists between the vehicle and the target obstacle. For example, the target obstacle has overtaken the vehicle. By controlling the vehicle to travel according to a predetermined travelling speed and direction, a distance between the vehicle and the target obstacle will become larger and larger.

By performing the method of controlling an autonomous vehicle provided in embodiments of the present disclosure, it is possible to avoid a waiting operation of executing lane-changing initiation due to adopting the lane-changing interruption strategy or the lane-changing termination strategy, thereby reducing a time length of the lane changing and improving the lane-changing efficiency, while improving a safety and continuity of the autonomous vehicle during the lane-changing process.

According to embodiments of the present disclosure, a current scene data for lane changing may be determined in response to the risk relief instruction being received. The planned path for lane changing is updated based on the current scene data for lane changing so that the on-board terminal may control the vehicle to travel according to the updated planned path for lane changing.

According to embodiments of the present disclosure, the current scene data for lane changing may include at least one of: obstacle data related to lane changing, vehicle data, environmental data, or road traffic rule data.

According to embodiments of the present disclosure, the obstacle data related to lane changing may include state data and attribute data such as a size of the obstacle, a travelling speed of the obstacle, a travelling direction of the obstacle, and a travelling acceleration of the obstacle.

According to embodiments of the present disclosure, the vehicle data may include state data and attribute data such as a size of the vehicle, a travelling speed of the vehicle, a travelling direction of the vehicle, and a travelling acceleration of the vehicle.

According to embodiments of the present disclosures, the environmental data may include objective travelling environment data such as weather, a visibility, a degree of road muddyness, a road congestion condition, and a road construction condition.

According to embodiments of the present disclosure, the road traffic rule data may include subjective travelling rule data such as a speed limit rule, an irreversible driving rule, and a non-cross-solid lane changing rule.

According to embodiments of the present disclosure, the planned path for lane changing is updated based on the current scene data for lane changing, thereby improving the safety and effectiveness of the updated planned path for lane changing.

Figure 5:
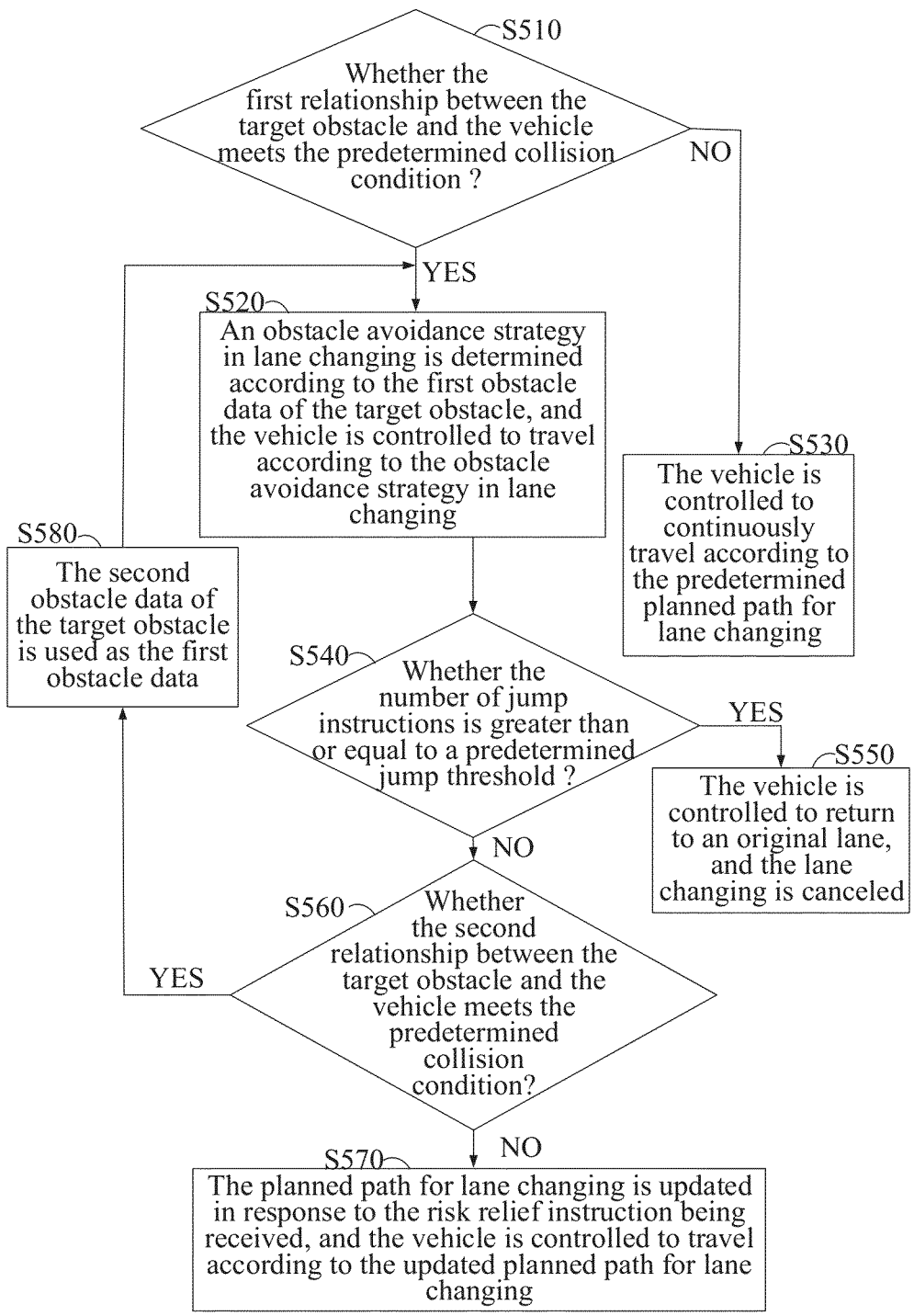
FIG. 5 schematically illustrates a flowchart of a method of controlling an autonomous vehicle according to another embodiment of the present disclosure.

FIG. 5 schematically illustrates a flowchart of a method of controlling an autonomous vehicle according to another embodiment of the present disclosure.

As shown in FIG. 5, the method includes operation S510 to operation S580.

In operation S510, it may be determined whether the first relationship between the target obstacle and the vehicle meets the predetermined collision condition or not based on the first obstacle data of the target obstacle and the first vehicle data of the vehicle. In response to determining that the first relationship between the target obstacle and the vehicle meets the predetermined collision condition, S520 is performed. In response to determining that the second relationship between the target obstacle and the vehicle does not meet the predetermined collision condition, S530 is performed.

In operation S520, an obstacle avoidance strategy in lane changing is determined according to the first obstacle data of the target obstacle, in response to the obstacle avoidance instruction being received. The vehicle is controlled to travel according to the obstacle avoidance strategy in lane changing.

In operation S530, the vehicle is controlled to continuously travel according to the predetermined planned path for lane changing.

In operation S540, it may be determined whether the number of jump instructions received within a predetermined time period is greater than or equal to a predetermined jump threshold or not. If the number of jump instructions is greater than or equal to the predetermined jump threshold, S550 is performed; and if the number of jump instructions is less than the predetermined jump threshold, S560 is performed.

In operation S550, the vehicle is controlled to return to an original lane, and the lane changing is canceled.

In operation S560, during a process of controlling the vehicle to travel according to the obstacle avoidance strategy in lane changing, it may be determined whether the second relationship between the target obstacle and the vehicle meets the predetermined collision condition or not. In response to determining that the second relationship between the target obstacle and the vehicle does not meet the predetermined collision condition, operation S570 is performed. In response to determining that the second relationship between the target obstacle and the vehicle meets the predetermined collision condition, operation S580 is performed.

In operation S570, the planned path for lane changing is updated in response to the risk relief instruction being received. The vehicle is controlled to travel according to the updated planned path for lane changing.

In operation S580, the second obstacle data of the target obstacle is used as the first obstacle data.

According to embodiments of the present disclosure, the jump instruction includes an obstacle avoidance instruction and/or a risk relief instruction. The number of jump instructions may include the first number of received obstacle avoidance instructions, and may also include the second number of received risk relief instructions, and may also include a sum of the first number of received obstacle avoidance instructions and the second number of received risk relief instructions.

According to embodiments of the present disclosure, during the lane-changing process, the vehicle may travel according to the obstacle avoidance instruction and the obstacle avoidance strategy in lane changing, and continue to change lanes in response to the risk relief instruction being received. Operations of obstacle avoidance, risk relief, and lane changing are performed repeatedly until the lane changing is completed or cancelled.

According to embodiments of the present disclosure, the predetermined jump threshold may refer to the maximum number of received jump instructions. By setting the predetermined jump threshold, the number of received jump instructions may be controlled, thereby reasonably controlling a time length of lane-changing travelling of the vehicle. For example, when the number of jump instructions is greater than or equal to the predetermined jump threshold, the lane changing is cancelled. In an actual process of lane-changing travelling, the greater the number of received jump instructions, the more complex the lane-changing scene or the more variable factors in the lane-changing scene. During the process, forcibly performing the lane-changing travelling operation has a high degree of danger and thus a high collision risk. By setting the predetermined jump threshold, the lane changing may be canceled when determining that the number of jump instructions is greater than or equal to the predetermined jump threshold, which may improve the intelligence, flexibility, and safety of the lane changing, and avoid a traffic accident caused by forcibly performing the lane-changing under a condition of complex lane-changing scene or multiple unexpected factors.

According to embodiments of the present disclosure, determining the second relationship between the target obstacle and the vehicle based on the second obstacle data of the target obstacle and the second vehicle data of the vehicle may include: determining a current category result of lane changing based on the current scene data for lane changing; determining an interaction data category based on the current category result of lane changing; determining, from the second obstacle data, target obstacle data matched with the interaction data category; determining, from the second vehicle data, target vehicle data matched with the interaction data category; and determining the second relationship between the target obstacle and the vehicle, based on the target obstacle data of the target obstacle and the target vehicle data of the vehicle. According to embodiments of the present disclosure, the determining a current category result of lane changing based on the current scene data for lane changing may include: determining, from a plurality of template scene data for lane changing, target template scene data for lane changing matched with the current scene data for lane changing. Based on a mapping relationship between template scene data for lane changing and the category result of lane changing, the current category result of lane changing matched with the target template scene data for lane changing is determined.

According to embodiments of the present disclosure, the category result of lane changing may refer to a scene category result of a traffic scene formed between the vehicle and a surrounding obstacle during the lane-changing process, for example, a category result of lane changing in which the vehicle changes lanes simultaneously with a parallel obstacle, a category result of lane changing in which an obstacle behind the vehicle changes lanes simultaneously with the vehicle, and a category result of lane changing in which an obstacle suddenly accelerates. However, the present disclosure is not limited to this. The category result of lane changing may also refer to a category result of a relative location relationship between an obstacle around the vehicle and the vehicle during the lane-changing process, such as a category result in which an obstacle exists in one or more of the front, rear, left side, or right side of the vehicle.

According to embodiments of the present disclosures, the plurality of template scene data for lane changing corresponding to different category results of lane changing may be obtained by collecting actual scene data for lane changing or through simulation. Taking the category result of lane changing that indicates a relative location relationship between the vehicle and the obstacle as an example, a mapping relationship between the category result of lane changing and the template scene data for lane changing may be constructed based on data such as the relative location relationship between the vehicle and the obstacle in the template scene data for lane changing. The target template scene data for lane changing matched with the current scene data for lane changing is determined from the plurality of template scene data for lane changing. The current category result of lane changing is determined based on the mapping relationship between the template scene data for lane changing and the category result of lane changing.

According to embodiments of the present disclosure, a similarity between each of the plurality of template scene data for lane changing and the current scene data for lane changing may be determined so as to obtain a plurality of similarities, and the template scene data for lane changing with the maximum similarity is used as the target template scene data for lane changing. A determination method of similarity is not limited, for example, the template scene data for lane changing and the current scene data for lane changing may be inputted into a trained Cross-Encoder or Bi-Encoder to obtain an output result of similarity.

According to embodiments of the present disclosure, a mapping relationship between the category result of lane changing and a predetermined interaction data category may be established. Based on the mapping relationship between the category result of lane changing and the predetermined interaction data category, an interaction data category matched with the current category result of lane changing may be determined. The predetermined interaction data category may include: a travelling trajectory category, a travelling speed category, a travelling direction category, and other travelling data categories related to interaction.

According to embodiments of the present disclosure, when the interaction data category matched with the current category result of lane changing is determined, the target obstacle data matched with the interaction data category may be determined from the second obstacle data. The target vehicle data matched with the interaction data category is determined from the second vehicle data. The second relationship between the target obstacle and the vehicle is determined based on the target obstacle data of the target obstacle and the target vehicle data of the vehicle.

For example, if it is determined that the current category result of lane changing is the category result of lane changing in which the vehicle changes lanes simultaneously with a parallel obstacle, then it may be determined that the interaction data category matched with the current category result of lane changing includes: a travelling trajectory category, a travelling speed category, and other travelling data categories related interaction. The target obstacle data matched with the interaction data category, such as travelling trajectory data of the target obstacle, travelling speed data of the target obstacle, and the like, may be determined from the second obstacle data. The target vehicle data matched with the interaction data category, such as travelling trajectory data of the vehicle, travelling speed data of the vehicle, and the like, may be determined from the second vehicle data. It may be determined whether the second relationship between the target obstacle and the vehicle meets the predetermined collision condition or not, where the second relationship is generated based on the target obstacle data of the target obstacle and the target vehicle data of the vehicle.

According to embodiments of the present disclosure, the current category result of lane changing is determined based on the current scene data for lane changing. The interaction data category is determined based on the current category result of lane changing. A preliminary understanding of lane-changing scene of the vehicle may be achieved. The target obstacle data matched with the interaction data category is determined from the second obstacle data. The target vehicle data matched with the interaction data category is determined from the second vehicle data. The second relationship between the target obstacle and the vehicle is determined based on the target obstacle data of the target obstacle and the target vehicle data of the vehicle. The target obstacle data is determined from the second obstacle data, and the target vehicle data is determined from the second vehicle data, thereby achieving an accurate understanding of the lane-changing scene. Thus, complex and variable lane-changing scenes may be easily and accurately analyzed by determining the category results of lane changing and predetermined interaction data categories in advance.

Figure 6:
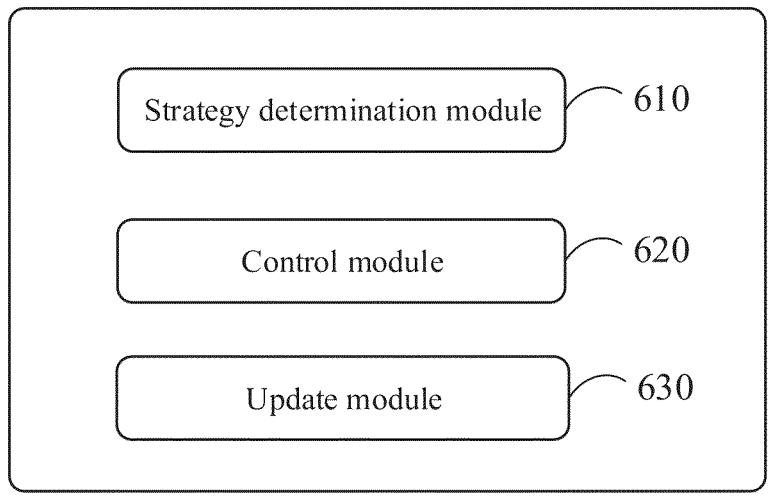
FIG. 6 schematically illustrates a block diagram of an apparatus of controlling an autonomous vehicle according to an embodiment of the present disclosure.

FIG. 6 schematically illustrates a block diagram of an apparatus of controlling an autonomous vehicle according to an embodiment of the present disclosure.

As shown in FIG. 6, an apparatus 600 of controlling an autonomous vehicle includes a strategy determination module 610, a control module 620, and an update module 630.

The strategy determination module 610 is used to determine, in response to an obstacle avoidance instruction being received, an obstacle avoidance strategy in lane changing according to first obstacle data of a target obstacle, where the obstacle avoidance instruction is generated in response to determining that a first relationship between the target obstacle and a vehicle meets a predetermined collision condition, and the first relationship between the target obstacle and the vehicle is generated based on the first obstacle data of the target obstacle and first vehicle data of the vehicle.

The control module 620 is used to control the vehicle to travel according to the obstacle avoidance strategy in lane changing.

The update module 630 is used to update a planned path for lane changing in response to a risk relief instruction being received so that the vehicle travels according to the updated planned path for lane changing, where the risk relief instruction is generated in response to determining that a second relationship between the target obstacle and the vehicle does not meet the predetermined collision condition, and the second relationship between the target obstacle and the vehicle is generated based on second obstacle data of the target obstacle and second vehicle data of the vehicle.

According to embodiments of the present disclosure, the update module includes a first data determination unit and an update unit.

The first data determination unit is used to determine current scene data for lane changing in response to the risk relief instruction being received. The current scene data for lane changing includes at least one of: obstacle data related to lane changing, vehicle data, environmental data, or road traffic rule data.

The update unit is used to update the planned path for lane changing based on the current scene data for lane changing.

According to embodiments of the present disclosure, the apparatus of controlling an autonomous vehicle further includes: prior to the update module, a second acquisition module, a second relationship determination module, and a second generation module.

The second acquisition module is used to acquire the second obstacle data of the target obstacle and the second vehicle data of the vehicle.

The second relationship determination module is used to determine the second relationship between the target obstacle and the vehicle based on the second obstacle data of the target obstacle and the second vehicle data of the vehicle.

The second generation module is used to generate the risk relief instruction in response to determining that the second relationship between the target obstacle and the vehicle does not meet the predetermined collision condition.

According to embodiments of the present disclosure, the second relationship determination module includes: a result determination unit, a category determination unit, a second data determination unit, a third data determination unit, and a relationship determination unit.

The result determination unit is used to determine a current category result of lane changing based on the current scene data for lane changing.

The category determination unit is used to determine an interaction data category based on the current category result of lane changing.

The second data determination unit is used to determine, from the second obstacle data, target obstacle data matched with the interaction data category.

The third data determination unit is used to determine, from the second vehicle data, target vehicle data matched with the interaction data category.

The relationship determination unit is used to determine the second relationship between the target obstacle and the vehicle based on the target obstacle data of the target obstacle and the target vehicle data of the vehicle.

According to embodiments of the present disclosure, the apparatus of controlling an autonomous vehicle further includes a calculation module and a cancellation module.

The calculation module is used to determine a number of jump instructions received within a predetermined time period. The jump instruction includes the obstacle avoidance instruction and/or the risk relief instruction.

The cancellation module is used to, in response to determining that the number of jump instructions is greater than or equal to a predetermined jump threshold, control the vehicle to return to an original lane, and cancel lane changing.

According to embodiments of the present disclosure, the control module includes a speed determination unit and a control unit.

The speed determination unit is used to determine a lateral acceleration and a longitudinal acceleration according to the obstacle avoidance strategy in lane changing.

The control unit is used to control the vehicle to travel according to the lateral acceleration and the longitudinal acceleration.

According to embodiments of the present disclosure, the apparatus of controlling an autonomous vehicle further includes: prior to the control module, a first acquisition module, a first relationship determination module, and a first generation module.

The first acquisition module is used to acquire the first obstacle data of the target obstacle and the first vehicle data of the vehicle.

The first relationship determination module is used to determine the first relationship between the target obstacle and the vehicle based on the first obstacle data of the target obstacle and the first vehicle data of the vehicle.

The first generation module is used to generate the obstacle avoidance instruction in response to determining that the first relationship between the target obstacle and the vehicle meets the predetermined collision condition.

According to embodiments of the present disclosure, the present disclosure further provides an electronic device, a readable storage medium, an autonomous vehicle, and a computer program product.

According to embodiments of the present disclosure, an electronic device includes: at least one processor; and a memory communicatively connected to the at least one processor, where the memory stores instructions executable by the at least one processor, and the instructions, when executed by the at least one processor, are used to cause the at least one processor to implement the method according to embodiments of the present disclosure.

According to embodiments of the present disclosure, a non-transitory computer readable storage medium having computer instructions therein, where the computer instructions are configured to cause a computer to implement the method according to embodiments of the present disclosure.

According to embodiments of the present disclosure, an autonomous vehicle is provided with the above-mentioned electronic device, and the electronic device may achieve the method of controlling an autonomous vehicle described in the above-mentioned embodiments when executed by a processor thereof.

According to embodiments of the present disclosure, a computer program product contains a computer program, and the computer program, when executed by a processor, is used to implement the method according to embodiments of the present disclosure.

Figure 7:
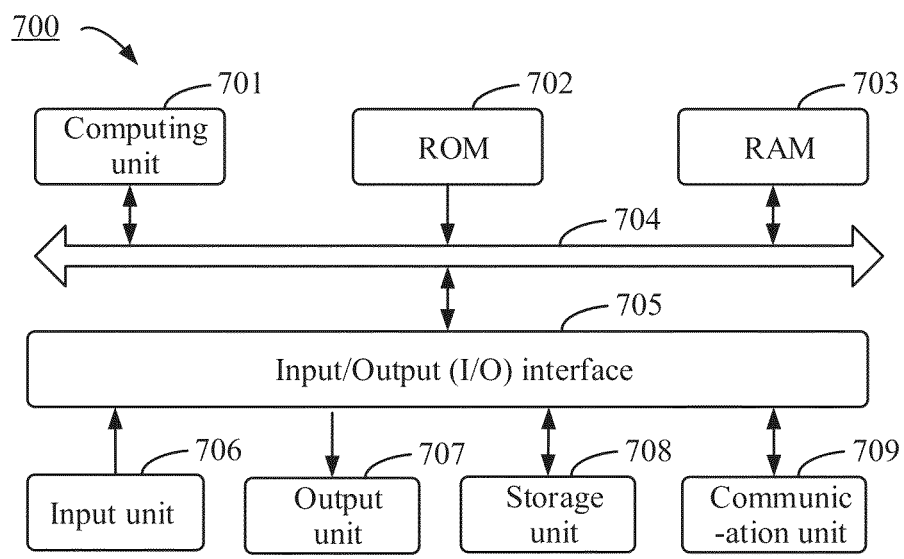
FIG. 7 schematically illustrates a block diagram of an electronic device suitable for implementing a method of controlling an autonomous vehicle according to an embodiment of the present disclosure.

FIG. 7 shows a schematic block diagram of an exemplary electronic device 700 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the device 700 includes a computing unit 701 which may perform various appropriate actions and processes according to a computer program stored in a read only memory (ROM) 702 or a computer program loaded from a storage unit 708 into a random access memory (RAM) 703. In the RAM 703, various programs and data necessary for an operation of the device 700 may also be stored. The computing unit 701, the ROM 702 and the RAM 703 are connected to each other through a bus 704. An input/output (I/O) interface 705 is also connected to the bus 704.

A plurality of components in the device 700 are connected to the I/O interface 705, including: an input unit 706, such as a keyboard, or a mouse; an output unit 707, such as displays or speakers of various types; a storage unit 708, such as a disk, or an optical disc; and a communication unit 709, such as a network card, a modem, or a wireless communication transceiver. The communication unit 709 allows the device 700 to exchange information/data with other devices through a computer network such as Internet and/or various telecommunication networks.

The computing unit 701 may be various general-purpose and/or dedicated processing assemblies having processing and computing capabilities. Some examples of the computing units 701 include, but are not limited to, a central processing unit (CPU), a graphics processing unit (GPU), various dedicated artificial intelligence (AI) computing chips, various computing units that run machine learning model algorithms, a digital signal processor (DSP), and any suitable processor, controller, microcontroller, etc. The computing unit 701 executes various methods and processes described above, such as the method of controlling an autonomous vehicle. For example, in some embodiments, the method of controlling an autonomous vehicle may be implemented as a computer software program which is tangibly embodied in a machine-readable medium, such as the storage unit 708. In some embodiments, the computer program may be partially or entirely loaded and/or installed in the device 700 via the ROM 702 and/or the communication unit 709. The computer program, when loaded in the RAM 703 and executed by the computing unit 701, may execute one or more steps in the method of controlling an autonomous vehicle described above. Alternatively, in other embodiments, the computing unit 701 may be used to perform the method of controlling an autonomous vehicle by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combining a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of controlling an autonomous vehicle, comprising:
   acquiring scene data for lane changing about surroundings of a vehicle in response to a lane-changing instruction being received;
   determining a lane-changing entrance based on the scene data for lane changing;
   generating a planned path for lane changing based on a travelling location of the vehicle and the lane-changing entrance;
   determining, in response to an obstacle avoidance instruction being received, an obstacle avoidance strategy in lane changing according to first obstacle data of a target obstacle in a process of controlling the vehicle to change lanes according to the planned path for lane changing, wherein the obstacle avoidance instruction is generated in response to determining that a first relationship between the target obstacle and the vehicle meets a predetermined collision condition, the first relationship between the target obstacle and the vehicle is generated based on the first obstacle data of the target obstacle and first vehicle data of the vehicle, and the obstacle avoidance strategy in lane changing refers to changing a travelling state of the vehicle while maintaining a lane change;
   controlling the vehicle to travel according to the obstacle avoidance strategy in lane changing; and
   updating a planned path for lane changing in response to a risk relief instruction being received, so that the vehicle travels according to the updated planned path for lane changing, wherein the risk relief instruction is generated in response to determining that a second relationship between the target obstacle and the vehicle does not meet the predetermined collision condition, and the second relationship between the target obstacle and the vehicle is generated based on second obstacle data of the target obstacle and second vehicle data of the vehicle.

2. The method according to claim 1, wherein the updating a planned path for lane changing in response to a risk relief instruction being received comprises:
   determining current scene data for lane changing in response to the risk relief instruction being received, wherein the current scene data for lane changing comprises at least one of obstacle data related to lane changing, vehicle data, environmental data, or road traffic rule data; and
   updating the planned path for lane changing based on the current scene data for lane changing.

3. The method according to claim 1, further comprising: before the updating a planned path for lane changing in response to a risk relief instruction being received, acquiring the second obstacle data of the target obstacle and the second vehicle data of the vehicle;
   determining the second relationship between the target obstacle and the vehicle based on the second obstacle data of the target obstacle and the second vehicle data of the vehicle; and
   generating the risk relief instruction in response to determining that the second relationship between the target obstacle and the vehicle does not meet the predetermined collision condition.

4. The method according to claim 3, wherein the determining the second relationship between the target obstacle and the vehicle based on the second obstacle data of the target obstacle and the second vehicle data of the vehicle comprises:
   determining a current category result of lane changing based on the current scene data for lane changing;
   determining an interaction data category based on the current category result of lane changing;
   determining, from the second obstacle data, target obstacle data matched with the interaction data category;
   determining, from the second vehicle data, target vehicle data matched with the interaction data category; and
   determining the second relationship between the target obstacle and the vehicle, based on the target obstacle data of the target obstacle and the target vehicle data of the vehicle.

5. The method according to claim 1, further comprising:
   determining a number of jump instructions received within a predetermined time period, wherein the jump instruction comprises the obstacle avoidance instruction and/or the risk relief instruction, wherein the number of jump instructions includes one of a first number of received obstacle avoidance instructions, a second number of received risk relief instructions, and a sum of the first number of received obstacle avoidance instructions and the second number of received risk relief instructions; and
   in response to determining that the number of jump instructions is greater than or equal to a predetermined jump threshold, controlling the vehicle to return to an original lane, and cancelling lane changing, wherein the predetermined jump threshold refers to a maximum number of received jump instructions.

6. The method according to claim 1, wherein the controlling the vehicle to travel according to the obstacle avoidance strategy in lane changing comprises:
   determining a lateral acceleration and a longitudinal acceleration according to the obstacle avoidance strategy in lane changing; and
   controlling the vehicle to travel according to the lateral acceleration and the longitudinal acceleration.

7. The method according to claim 1, further comprising: before the controlling the vehicle to travel according to the obstacle avoidance strategy in lane changing,
  acquiring the first obstacle data of the target obstacle and the first vehicle data of the vehicle;
  determining the first relationship between the target obstacle and the vehicle, based on the first obstacle data of the target obstacle and the first vehicle data of the vehicle; and
  generating the obstacle avoidance instruction in response to determining that the first relationship between the target obstacle and the vehicle meets the predetermined collision condition.

8. An electronic device, comprising:
  at least one processor; and
  a memory communicatively connected to the at least one processor,
  wherein the memory stores instructions executable by the at least one processor, and the instructions, when executed by the at least one processor, are configured to cause the at least one processor to at least:
  acquire scene data for lane changing about surroundings of a vehicle in response to a lane-changing instruction being received;
  determine a lane-changing entrance based on the scene data for lane changing;
  generate a planned path for lane changing based on a travelling location of the vehicle and the lane-changing entrance;
  determine, in response to an obstacle avoidance instruction being received, an obstacle avoidance strategy in lane changing according to first obstacle data of a target obstacle in a process of controlling the vehicle to change lanes according to the planned path for lane changing, wherein the obstacle avoidance instruction is generated in response to determining that a first relationship between the target obstacle and the vehicle meets a predetermined collision condition, the first relationship between the target obstacle and the vehicle is generated based on the first obstacle data of the target obstacle and first vehicle data of the vehicle, and the obstacle avoidance strategy in lane changing refers to changing a travelling state of the vehicle while maintaining a lane change;
  control the vehicle to travel according to the obstacle avoidance strategy in lane changing; and
  update a planned path for lane changing in response to a risk relief instruction being received, so that the vehicle travels according to the updated planned path for lane changing, wherein the risk relief instruction is generated in response to determining that a second relationship between the target obstacle and the vehicle does not meet the predetermined collision condition, and the second relationship between the target obstacle and the vehicle is generated based on second obstacle data of the target obstacle and second vehicle data of the vehicle.

9. The electronic device according to claim 8, wherein the instructions are further configured to cause the at least one processor to at least:
  determine current scene data for lane changing in response to the risk relief instruction being received, wherein the current scene data for lane changing comprises at least one of obstacle data related to lane changing, vehicle data, environmental data, or road traffic rule data; and
  update the planned path for lane changing based on the current scene data for lane changing.

10. The electronic device according to claim 8, wherein the instructions are further configured to cause the at least one processor to at least:
  acquire the second obstacle data of the target obstacle and the second vehicle data of the vehicle;
  determine the second relationship between the target obstacle and the vehicle based on the second obstacle data of the target obstacle and the second vehicle data of the vehicle; and
  generate the risk relief instruction in response to determining that the second relationship between the target obstacle and the vehicle does not meet the predetermined collision condition.

11. The electronic device according to claim 10, wherein the instructions are further configured to cause the at least one processor to at least:
  determine a current category result of lane changing based on the current scene data for lane changing;
  determine an interaction data category based on the current category result of lane changing;
  determine, from the second obstacle data, target obstacle data matched with the interaction data category;
  determine, from the second vehicle data, target vehicle data matched with the interaction data category; and
  determine the second relationship between the target obstacle and the vehicle, based on the target obstacle data of the target obstacle and the target vehicle data of the vehicle.

12. The electronic device according to claim 8, wherein the instructions are further configured to cause the at least one processor to at least:
  determine a number of jump instructions received within a predetermined time period, wherein the jump instruction comprises the obstacle avoidance instruction and/or the risk relief instruction, wherein the number of jump instructions includes one of a first number of received obstacle avoidance instructions, a second number of received risk relief instructions, and a sum of the first number of received obstacle avoidance instructions and the second number of received risk relief instructions; and
  in response to determining that the number of jump instructions is greater than or equal to a predetermined jump threshold, control the vehicle to return to an original lane, and cancelling lane changing, wherein the predetermined jump threshold refers to a maximum number of received jump instructions.

13. The electronic device according to claim 8, wherein the instructions are further configured to cause the at least one processor to at least:
  determine a lateral acceleration and a longitudinal acceleration according to the obstacle avoidance strategy in lane changing; and
  control the vehicle to travel according to the lateral acceleration and the longitudinal acceleration.

14. The electronic device according to claim 8, wherein the instructions are further configured to cause the at least one processor to at least:
  acquire the first obstacle data of the target obstacle and the first vehicle data of the vehicle;
  determine the first relationship between the target obstacle and the vehicle, based on the first obstacle data of the target obstacle and the first vehicle data of the vehicle; and generate the obstacle avoidance instruction in response to determining that the first relationship between the target obstacle and the vehicle meets the predetermined collision condition.

15. A non-transitory computer readable storage medium having computer instructions therein, wherein the computer instructions are configured to cause a computer to at least:
acquire scene data for lane changing about surroundings of a vehicle in response to a lane-changing instruction being received;
determine a lane-changing entrance based on the scene data for lane changing;
generate a planned path for lane changing based on a travelling location of the vehicle and the lane-changing entrance;
determine, in response to an obstacle avoidance instruction being received, an obstacle avoidance strategy in lane changing according to first obstacle data of a target obstacle in a process of controlling the vehicle to change lanes according to the planned path for lane changing, wherein the obstacle avoidance instruction is generated in response to determining that a first relationship between the target obstacle and the vehicle meets a predetermined collision condition, the first relationship between the target obstacle and the vehicle is generated based on the first obstacle data of the target obstacle and first vehicle data of the vehicle, and the obstacle avoidance strategy in lane changing refers to changing a travelling state of the vehicle while maintaining a lane change;
control the vehicle to travel according to the obstacle avoidance strategy in lane changing; and
update a planned path for lane changing in response to a risk relief instruction being received, so that the vehicle travels according to the updated planned path for lane changing, wherein the risk relief instruction is generated in response to determining that a second relationship between the target obstacle and the vehicle does not meet the predetermined collision condition, and the second relationship between the target obstacle and the vehicle is generated based on second obstacle data of the target obstacle and second vehicle data of the vehicle.

16. The non-transitory computer readable storage medium according to claim 15, wherein the computer instructions are further configured to cause the computer to at least:
determine current scene data for lane changing in response to the risk relief instruction being received, wherein the current scene data for lane changing comprises at least one of obstacle data related to lane changing, vehicle data, environmental data, or road traffic rule data; and
update the planned path for lane changing based on the current scene data for lane changing.

17. The non-transitory computer readable storage medium according to claim 15, wherein the computer instructions are further configured to cause the computer to at least:
acquire the second obstacle data of the target obstacle and the second vehicle data of the vehicle;
determine the second relationship between the target obstacle and the vehicle based on the second obstacle data of the target obstacle and the second vehicle data of the vehicle; and
generate the risk relief instruction in response to determining that the second relationship between the target obstacle and the vehicle does not meet the predetermined collision condition.

18. The non-transitory computer readable storage medium according to claim 17, wherein the computer instructions are further configured to cause the computer to at least:
determine a current category result of lane changing based on the current scene data for lane changing;
determine an interaction data category based on the current category result of lane changing;
determine, from the second obstacle data, target obstacle data matched with the interaction data category;
determine, from the second vehicle data, target vehicle data matched with the interaction data category; and
determine the second relationship between the target obstacle and the vehicle, based on the target obstacle data of the target obstacle and the target vehicle data of the vehicle.

19. The non-transitory computer readable storage medium according to claim 15, wherein the computer instructions are further configured to cause the computer to at least:
determine a number of jump instructions received within a predetermined time period, wherein the jump instruction comprises the obstacle avoidance instruction and/or the risk relief instruction, wherein the number of jump instructions includes one of a first number of received obstacle avoidance instructions, a second number of received risk relief instructions, and a sum of the first number of received obstacle avoidance instructions and the second number of received risk relief instructions; and
in response to determining that the number of jump instructions is greater than or equal to a predetermined jump threshold, control the vehicle to return to an original lane, and cancelling lane changing, wherein the predetermined jump threshold refers to a maximum number of received jump instructions.

20. The non-transitory computer readable storage medium according to claim 15, wherein the computer instructions are further configured to cause the computer to at least:
determine a lateral acceleration and a longitudinal acceleration according to the obstacle avoidance strategy in lane changing; and
control the vehicle to travel according to the lateral acceleration and the longitudinal acceleration.

* * * * *